United States Patent [19]

Boudreau et al.

[11] Patent Number: 4,493,036
[45] Date of Patent: Jan. 8, 1985

[54] PRIORITY RESOLVER HAVING DYNAMICALLY ADJUSTABLE PRIORITY LEVELS

[75] Inventors: Daniel A. Boudreau; Edward R. Salas, both of Billerica, Mass.

[73] Assignee: Honeywell Information Systems Inc., Waltham, Mass.

[21] Appl. No.: 449,702

[22] Filed: Dec. 14, 1982

[51] Int. Cl.³ .............................................. G06F 9/46
[52] U.S. Cl. ................................................... 364/200
[58] Field of Search ... 364/200 MS File, 900 MS File

[56] References Cited

U.S. PATENT DOCUMENTS 3,919,692  11/1975  Kronies et al. ............... 364/200
3,921,145  11/1975  Emm et al. .................... 364/200

Primary Examiner—Raulfe B. Zache
Attorney, Agent, or Firm—William A. Linnell; Nicholas Prasinos

[57] ABSTRACT

A data processing system including a dual ported main memory that can be accessed by I/O controllers via a common bus or directly by the central processing unit. The main memory is comprised of a volatile RAM array that requires periodic refreshing to prevent loss of information. Access to the main memory is controlled by a priority resolver that awards access to the main memory on the basis of predetermined priority levels assigned to CPU, I/O and refresh requests. The priority resolver produces an early signal that is usable to initiate a memory cycle before the final winner of the main memory is determined. The logic path of the lowest priority requester is the shortest path thus allowing the lowest priority requester to initiate a memory cycle in the shortest amount of time even though another requester may ultimately win use of the memory. The priority resolver also provides for the early resetting of access requests so that subsequent requests can be made with minimum delay. Logic is provided that allows the predetermined priority levels to be adjusted dynamically as a function of system conditions.

19 Claims, 5 Drawing Figures

PRIORITY RESOLVER HAVING DYNAMICALLY ADJUSTABLE PRIORITY LEVELS

RELATED APPLICATIONS

The following patent application, which is assigned to the same assignee as the instant application, has related subject matter and is incorporated herein by reference.

| TITLE | INVENTORS | SERIAL NUMBER |
|---|---|---|
| Priority Resolver With Lowest Priority Level Having Shortest Logic Path | Daniel A. Boudreau and Edward R. Salas | 449,703 |

BACKGROUND OF THE INVENTION

1. Field of the Invention

This invention relates to data processing systems and more specifically to a method and apparatus for resolving the allocation of a shared resource on a priority basis such that the requester having the lowest priority has the shortest path through the priority resolving logic.

2. Description of the Prior Art

FIG. 1 shows a data processing system comprised of a CPU 101, a main memory 102, a first I/O controller 103 with an attached I/O device 105 and a second I/O controller 104 with an attached I/O device 106, and common bus 107. In FIG. 1, the thinner lines connecting the various components are control lines and the thicker lines connecting the components are data/address lines. In this system, both program instructions and data are stored in main memory 102.

Main memory 102 is a dual ported memory such that one port connects to the common bus 107 so that memory requests and data transfers may be made by either I/O controller 103 or I/O controller 104 via common bus 107 whereas requests for memory from CPU 101 normally take place directly between CPU 101 and main memory 102 without going via common bus 107.

Because main memory 102 maintains information in volatile RAM array 110, such as MOS semiconductor memory chips, it requires periodic refresh in order not to lose its information content. Main memory 102 contains refresh logic 109 which periodically makes a request for the memory for the purpose of refreshing the volatile RAM array 110.

Priority resolver logic 108 is provided within the main memory 102 to resolve the possible conflicts between competing requests for access to RAM array 110. These competing requests can come from an I/O controller wanting access to the main memory to read or write information from it or into it or from the CPU requesting to read or write into RAM array 110 or from refresh logic 109 requesting access to the RAM array in order to refresh the information contained therein. Priority resolver 108 is in addition to any priority scheme which is used to resolve competing requests for use of the common bus.

In a system in which the refresh logic 109, I/O controller 103 or 104 and CPU 101 may be making competing requests, it is well known in the art to assign priorities to the competing requests such that the highest priority requester will be granted the shared resource over any lower priority requesters then making a request. One scheme is to assign the highest priority to the refresh logic, the medium priority to a request from the common bus which in this case would be from another one of the I/O controllers 103 or 104 and the lowest priority of the CPU 101.

This assignment of priority levels has the advantage that the refresh logic normally must receive access at well defined periodic intervals in order to refresh volatile RAM array 110 and the postponement of the refreshing can result in loss of memory information. Middle priority is assigned to requests originating from the common bus, which in this case in from the I/O controllers, because I/O controllers are usually in less of a position to be postponed too long when requesting access to the main memory. For instance, when writing to a disk, if the data is not immediately avalible to the disk and arrives too late to the controller, the disk will have rotated further than the desired position to write the data and this will result in a data underrun error. When reading from a disk, if the data is not taken from the I/O controller, the second word of data may arrive before the first word is taken and result in a data overrun error. Because the time constraints in reading and writing to an I/O device are usually such that a refresh operation can be performed between successive words of data, the refresh operation is given higher priority over that of access from the common bus. Memory requests from the CPU are given the lowest priority because the CPU is usually designed such that access to operand data and program instructions within the main memory is not critical to the extent that the CPU can wait until the memory becomes available without losing data. The only consequence of having to wait being that the program executes more slowly each time the CPU has to wait for the memory to become available to it. Thus, access priority is assigned in the order of real time constraints with the device having the least demanding time constraint being given the lowest priority.

Although various schemes from resolving competing requests on a priority basis are well known in the art, most of these schemes work such that the shared resources is granted to the highest priority device in the shortest amount of time, that is, the priority resolver has the shortest logical path used by the highest priority request. Alternatively, the logic paths for all requests are of equal length such that the resolution of the competing requests takes equal time, independent of the priority level of the requester. However, because the central processing unit in most data processing systems makes the most requests of main memory and it is often assigned the lowest priority with respect to access of the main memory, it would be desirable in order to speed up program execution wherever possible to have the lowest priority requester have the shortest logical path through the resolver logic.

Further, most priority resolvers allocate the shared resource on a fixed priority basis. However, there may be times when the priority assignment must be changed. For example, if the CPU which normally does not access memory while performing a real time operation performs an operation that has real time constraints, such as a very high speed transfer to disk or a communication line, where the data flows through the CPU on its way to or from memory. In this case, the CPU priority level must be raised so the CPU will have priority over other I/O requests during the high speed transfer.

Therefore, what is desired is to have a priority resolver logic with the shortest logical path being used by the lowest priority requesting device. It is also desirable in a priority resolver, particularly when resolving competing requests for access to main memory, to be able to initiate a cycle as early as possible even before the final resolution as to which one of the competing requests will be granted access to the shared resource. Further, it is desirable to be able to dynamically raise in priority level one or more low priority levels so that they are given higher priority as conditions require.

OBJECTS OF THE INVENTION

Accordingly, it is the primary object of this invention to provide an improved priority resolver wherein the priority level among competing requests can be adjusted dynamically.

It is another object of the present invention to provide a new and improved system for resolving priorities between competing requests wherein the priority resolver will produce a signal indicating that there are one or more outstanding requests even before making the final resolution of the priority among the competing requests.

It is a further object of the present invention to provide an improved technique and apparatus for resolving priorities among competing requests for a shared resource that is both fast in time and low in cost.

This invention is pointed out with particularity in the appended claims. An understanding of the above and further objects and advantages of this invention can be obtained by referring to the following description taken in conjunction with the drawings.

SUMMARY OF THE INVENTION

The foregoing objects are achieved according to one embodiment of the invention according to one mode of operation thereof, by providing in a data processing system, a priority resolver for allocating a shared resource. The priority resolver is comprised of an ask flip-flop for each priority level that is set by a signal requesting use of the shared resource. These individual ask flip-flops can be set at any time within a priority resolution cycle and remain set until the associated priority level has won use of the shared resource. By resetting the ask flip-flop of the winning priority level relatively early within a priority resolution cycle, a subsequent request for the shared resource can be made and the same priority level can compete in the next priority resolution cycle.

The output of individual ask flip-flops is connected to the inputs of corresponding grant flip-flops. During a normal priority resolution cycle, these individual grant flip-flops are set at the beginning of each priority resolution cycle if their corresponding ask flip-flop is set at the beginning of the priority resolution cycle. In a normal priority resolution cycle, as many grant flip-flops will set as there are ask flip-flops set at the beginning of a priority resolution cycle. All grant flip-flops are reset at the end of each priority resolution cycle by a common ask reset signal. When this reset signal returns to its non-reset state, the next priority resolution cycle can begin.

The output of all grant flip-flops is ORed together to provide an early shared resource initiate signal that indicates that at least one priority level has requested use of the shared resource even though the final winner has not yet been determined. The output of each grant flip-flops is also used to partially enable a first gate associated with the priority level that has as additional inputs the inverted outputs of all higher priority grant flip-flops. The individual outputs of these first gates indicate that associated priority level might win use of the shared resource.

The initiate signal is delayed a sufficient time to allow all grant flip-flops that are going to be set during the priority resolution cycle time to set. This delayed initiate signal is used as one input to individual second gates associated with each priority level that have as their other input the output of their corresponding first gates. During any given priority resolution cycle, only one of these second gates is fully enabled and its output indicates that the associated priority level has won access to the shared resource.

The output of the individual second gates is fed back to reset its corresponding ask flip-flop so that once the real winner has been determined, its corresponding ask flip-flop will be reset while those ask flip-flops of the non-winning priority remain unchanged.

Placed between each ask flip-flop and its corresponding grant flip-flop, of all but those of the lowest priority level, is a set gate which is partially enabled by the output of its ask flip-flop, if the ask flip-flop has been set by a request. Each set gate further receives a common request cut-off signal. This cut-off signal, which is initially in an enable state at the beginning of a normal priority resolution cycle, is derived from delaying the initiate signal a sufficient time to allow all grant flip-flops to set so that have their corresponding ask flip-flops set at the beginning of a normal priority resolution cycle. Each set gate also receives as inputs the inverted output of all lower priority grant flip-flops such that the setting of any lower priority grant flip-flop will prevent any late arriving request from setting its corresponding grant flip-flop. The output of each set gate is connected to set its corresponding grant flip-flop if the set gate is fully enabled. The lowest priority level's ask flip-flop is connected directly to set its grant flip-flop thus making the lowest priority logic path the shortest logical path.

The ask reset signal is derived by delaying the initiate signal. The ask reset signal returns to the non-reset state to start a priority resolution cycle. During a normal priority resolution cycle, the request cut-off signal assumes the request enable state which partially enables all set gates before the priority resolution cycle begins. During an inverse priority resolution cycle, the request cut-off signal of those set gates associated with priority levels which are to be lowered in priority assumes the request enable state after the priority resolution cycle begins by the reset signal returning to the non-reset state. This delaying of the cut-off signal until after the beginning of an inverse priority cycle allows the grant flip-flops of the priority levels that have been raised in priority an opportunity to set and thus disable all normally higher priority set gates and thereby prevent a normally higher priority request from setting its corresponding grant flip-flop. This inhibiting of the setting of a normally higher priority grant flip-flops prevents the higher priority request from winning the shared resource during the inverse priority resolution cycle and therefore has effectively inverted the priority order.

Because the logic associated with the lowest priority level does not contain a set gate between its ask and grant flip-flops, the lowest priority request can initiate a request for the shared resource in less time than any other priority level. Logic is also provided for the early resetting of individual grant flip-flops. By ORing the outputs of any priority level's grant and ask flip-flops, a signal can be provided to determine if the priority level is finished with the shared resource.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 1:
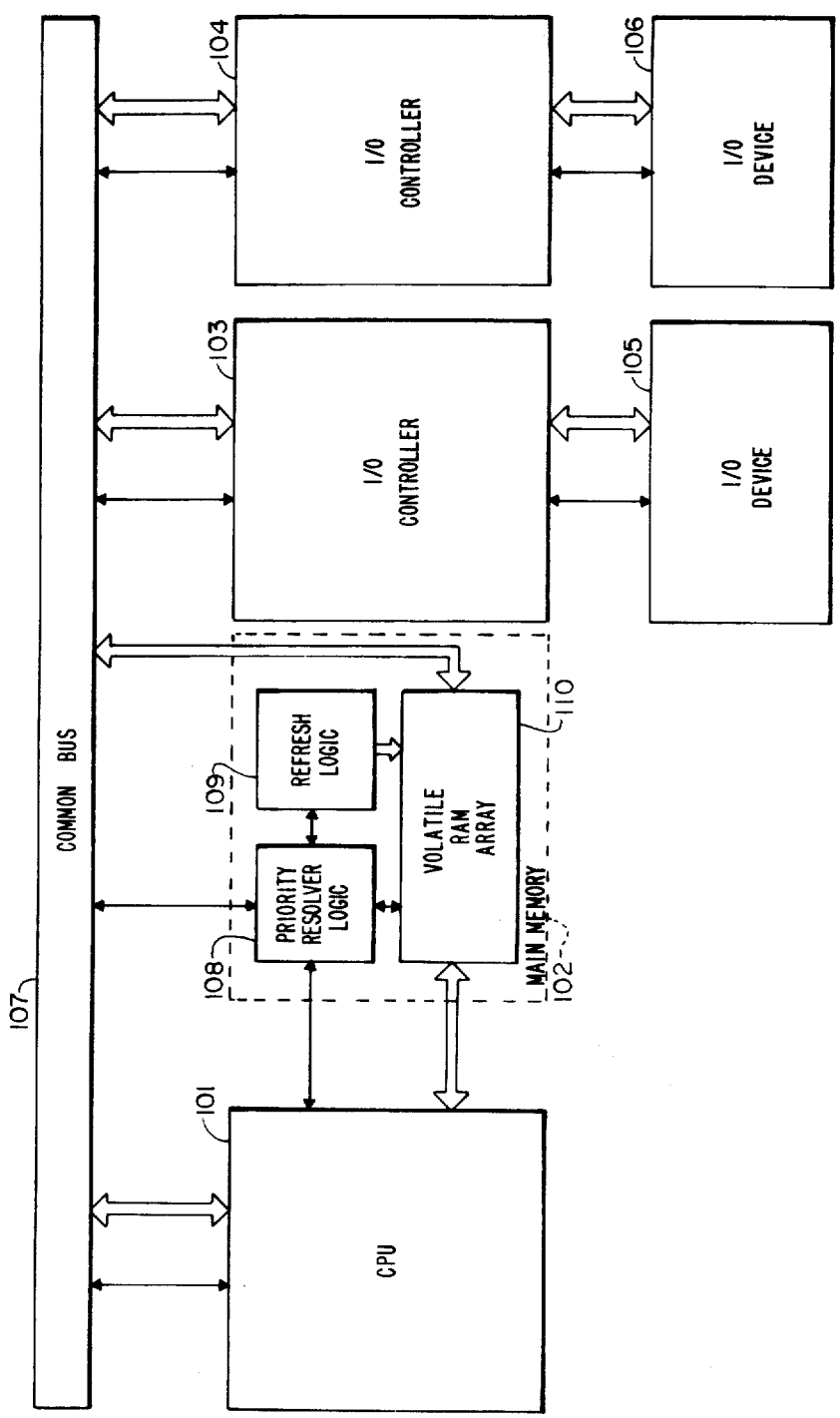
FIG. 1 is a general block diagram of a data processing system using a priority resolver.
Figure 2:
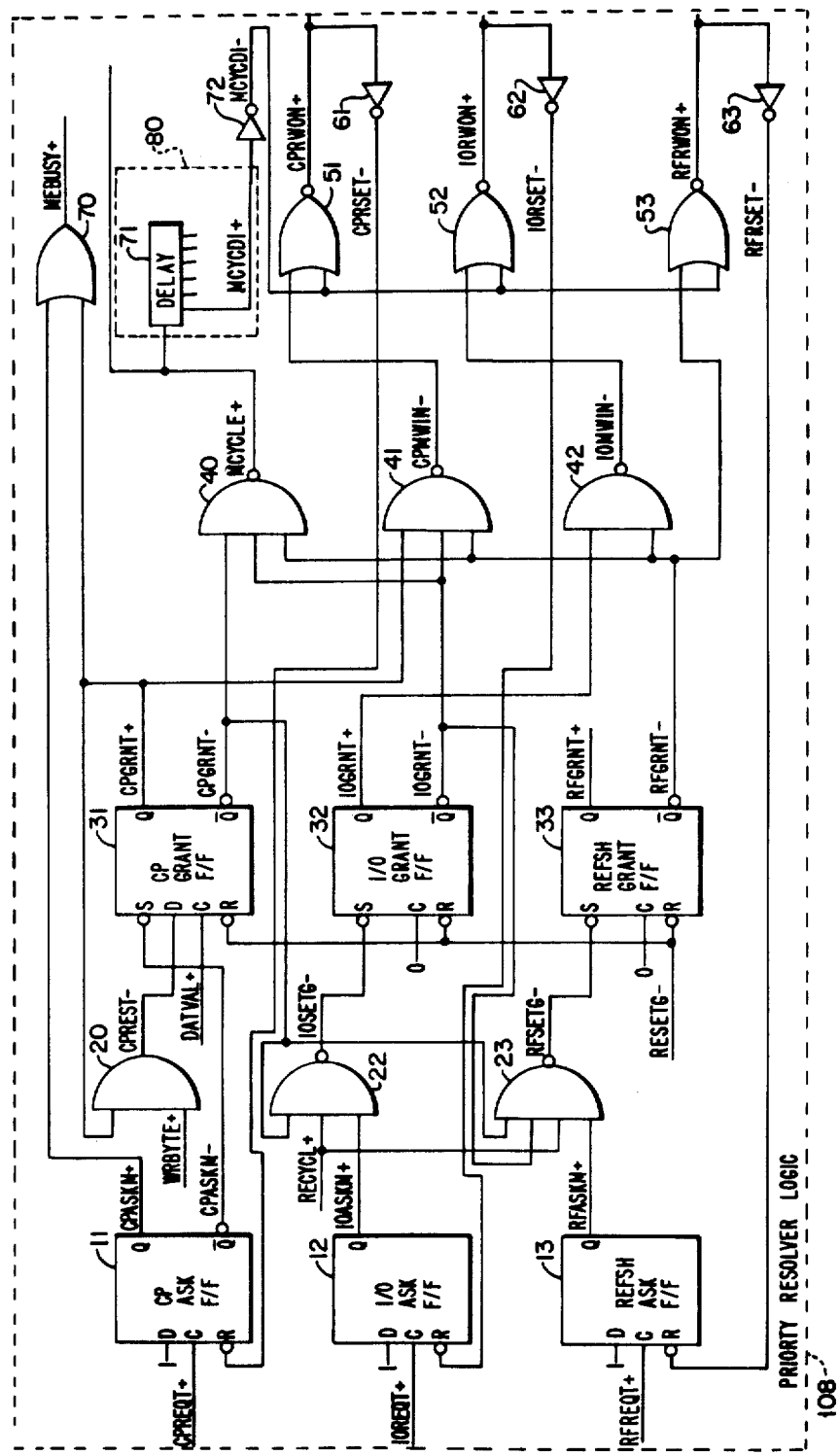
FIG. 2 is a logic block diagram of the priority resolver of the present invention.

FIG. 2 is a logic block diagram of priority resolver logic 108 within main memory 102 of FIG. 1. In FIG. 2, the small circles on the inputs or outputs of the logic elements represent inverting inputs and outputs respectively. FIG. 2 illustrates the resolver logic of the preferred embodiment and is used to resolve competing requests from the CPU 101, the common bus 107 originating from I/O controllers 103 and 104, and refresh logic 109 (see FIG. 1). The principles of this invention, however, are applicable to resolving competing requests from two to N devices by either reduction or extension as applicable.

Turning now to FIG. 2, the layout of the logic block diagram is such that horizontal rows across the page are more or less associated with individual priority levels. The logic elements associated with the lowest priority level occupying the top of the figure, the logic elements associated with a medium priority level occupying the center of the figure, and the logic elements associated with the highest priority occupying the bottom of the figure. FIG. 2 is also laid out with the logic elements performing similar function arranged in vertical columns with one column being comprised of CP ask flip-flop 11, I/O ask flip-flop 12, and refresh ask flip-flop 13. The second column being comprised of NAND gates 22 and 23, a third column being comprised of CP grant flip-flop 31, I/O grant flip-flop 32, and refresh grant flip-flop 33. A fourth column is comprised of NAND gates 40, 41 and 42 with a fifth column being comprised of NOR gates 51, 52 and 53 and a sixth column being comprised of inverter 61, 62 and 63.

Individual ask flip-flops 11, 12 and 13 are set individually each time their corresponding device makes a request for a memory cycle to perform a read, write or memory refresh operation. The individual ask flip-flops stay set until the requests for memory has been honored for that particular device. For example, if the CPU 101 wants a memory cycle, signal CPREQT+ at the clock (C) input of CP ask flip-flop 11 will pulse (transition from the binary ZERO to the binary ONE state and return to the binary ZERO state) and clock the binary ONE at the data (D) input and thereby set the flip-flop causing the output (Q) signal CPASKM+ to become a binary ONE and the inverted (Q-bar) output, signal CPASKM−, to become a binary ZERO. Similarly, I/O ask flip-flop 12 is set by signal IOREQT+ transitioning to the binary ONE state and refresh ask flip-flop 13 is set by signal RFREQT+ transitioning to the binary ONE state. Ask flip-flops 11, 12 and 13 can be set at any time during a memory cycle independent of where in the memory cycle the memory is, or where in the priority resolution process, the priority resolver logic 108 is.

As will be seen below, the ask flip-flop associated with the priority level that actually ends up winning a memory cycle will be reset once the winning priority level has been determined. This resetting of the ask flip-flop is done by a binary ZERO signal appearing at the reset (R) input of the ask flip-flop 11, 12 or 13 as applicable. The ask flip-flop of the winning priority level is reset relatively early within a memory cycle and once reset that ask flip-flop may be set by a subsequent request from the same device so that the same priority level may compete for the next memory cycle.

During a normal priority operation, individual grant flip-flops 31, 32 and 33 are set at the beginning of each priority resolution cycle if the corresponding ask flip-flop is set at the beginning of the priority resolution cycle. For example, I/O grant flip-flop 32 will be set at the beginning of a priority resolution cycle if I/O ask flip-flop 12 is set at the beginning of the priority resolution cycle. As many grant flip-flops 31, 32 and 33 will be set as there are ask flip-flops set at the beginning of the priority resolution cycle. During an inverse priority operation, the enabling of the outputs of higher priority ask flip-flops is delayed in order to allow the setting of lower priority ask flip-flops which will disable the output of any higher priority ask flip-flop for the priority resolution cycle and thereby invert the order of the priority of competing requests. This inverting of the priority levels is controlled by inverse priority control logic 80 of FIGS. 2 and 4 with a normal priority operation taking place when signal PRCNTL− is a binary ONE and an inverse priority operation taking place when signal PRCNTL− is a binary ZERO. During bboth normal or inverse priority operations, all grant flip-flops are reset at the end of each priority resolution cycle.

The purpose of grant flip-flops 31, 32 and 33 is to produce a stable, glitch-free, signal indicating whether or not the corresponding ask flip-flop for the associated priority level was set at the beginning of a priority resolution cycle. Grant flip-flops 31, 32 and 33 are individually set by binary ZERO signals appearing at their set (S) inputs at the beginning of a priority resolution cycle and are reset by a binary ZERO cycle appearing at their reset (R) inputs. As can be seen, the reset signal for grant flip-flops 31, 32 and 33 is the common signal RESETG− which becomes a binary ZERO at the end of each priority resolution cycle. When signal RESETG− returns to the binary ONE state, the next priority resolution cycle starts to determine the highest priority requester among these that have already set their ask flip-flops. The binary ONE to binary ZERO, and the binary ZERO to binary ONE, transitions of signal RESETG− are derived by delaying the binary ZERO to binary ONE transition of signal MCYCLE+ (see FIGS. 3 and 5) by the inverse priority control logic shown in FIG. 4. That is, the falling and rising edges of signal RESETG− are derived from the rising edge of signal MCYCLE+. During a normal priority operation, the rising edge of signal RESETG— occurs after the rising edge of signal RECYCL+ (see FIG. 5) thus assuring that NAND gates 22 and 23 will be partially enabled by signal RECYCL+ becoming a binary ONE before the next priority resolution cycle is started by signal RESETG— becoming a binary ONE. During an inverse priority operation, the rising edge of signal RESETG— occurs before the rising edge of signal RECYCL+ (see FIG. 5) thus assuring that lower priority grant flip-flops have an opportunity to set so that their Q-bar outputs can disable NAND gates 22 and 23 before signal RECYCL+ becomes a binary ONE thus permitting a lower priority request to win the priority resolution cycle and thus invert the priority order.

NAND gates 22 and 23 prevent a higher priority request coming in and setting its corresponding grant flip-flop after a lower priority request has already won the shared resource cycle. There is no NAND gate associated with CP grant flip-flop 31 because there is no device capable of making a request that is lower in priority than the CPU request. NAND gates 22 and 23 each have as inputs the RECYCL+ signal which, during a normal priority operation, becomes a binary ONE before the beginning of a priority resolution cycle and thereby partially enables the NAND gates. During an inverse priority operation, the partial enabling of NAND gates 22 and 23 is inhibited by signal RECYCL+ remaining a binary ONE until after the priority resolution cycle has begun, thereby permitting a lower priority grant flip-flop to set and block any higher priority requests for the priority resolution cycle.

Each NAND gate 22 and 23 also receives the Q output of its corresponding ask flip-flop which will be a binary ONE if its corresponding ask flip-flop is set to indicate that the priority level is making a request for the shared resource. In addition, NAND gates 22 and 23 each receive the Q-bar output of all the grant flip-flops associated with lower priority requests. These Q-bar outputs of lower priority grant flip-flops, that will be binary ZEROs when the grant flip-flop is set, are also used to disable NAND gates 22 and 23 during an inverse priority operation. NAND gate 22 receives signal CPGRNT— from CP grant. flip-flop 31 and NAND gate 23 receives signal CPGRNT— from CP grant flip-flop 31 and also signal IOGRNT— from I/O grant flip-flop 32. NAND gate 22 prevents the setting of I/O grant flip-flop 32 by inhibiting the output of I/O ask flip-flop 12 if it is late in a priority resolution cycle such that signal RECYCL+ has become a binary ZERO or if CP grant flip-flop 31, which is lower priority, has already been set even though signal RECYCL+ has not yet become a binary ZERO after being a binary ONE during a priority resolution cycle. During a normal priority resolution cycle, a lower priority grant flip-flop can set before a higher priority grant flip-flop if the lower priority request comes in ahead of the higher priority request which can result in setting the lower priority ask flip-flop before the higher priority grant flip-flop. During an inverse priority resolution cycle, the setting of the higher priority ask flip-flops is delayed by not enabling the higher priority NAND gates, such as 22 and 23, until after the lower priority ask flip-flops, such as 31, have had an opportunity to set. Similarly, NAND gate 23 prevents the setting of refresh grant flip-flop 33 by the output of refresh ask flip-flop 13 if it is late in the priority resolution cycle such that RECYCL+ has become a binary ZERO or if either CP grant flip-flop 31 or I/O grant flip-flop 32 is already set even though signal RECYCL+ has not become a binary ZERO after being a binary ONE during the priority resolution cycle. Both the binary ONE to binary ZERO transition and the binary ZERO to binary ONE transition of signal RECYCL+ are derived by delaying the binary ZERO to binary ONE transition of signal MYCLE+ (see FIGS. 3 and 5) by the inverse priority control logic shown in FIG. 4. That is, both the falling and rising edges of signal RECYCL+ are derived from the rising edge of signal MCYCLE+.

It should be noted the signal RECYCL+ becomes a binary ONE before signal RESETG— becomes a binary ONE (see FIG. 5) at the beginning of a normal priority resolution cycle so that NAND gates 22 and 23 will be partially enabled at the beginning of a normal priority resolution cycle so that if their corresponding ask flip-flop is set, the binary ZERO output by NAND 22 and/or 23 will have time to set their corresponding grant flip-flop 32 and/or 33 before possibly being cut off by the setting of a lower priority grant flip-flop. During an inverse priority operation, signal RESETG— becomes a binary ONE before signal RECYCl+ becomes a binary ONE (see FIG. 5) at the beginning of an inverse priority resolution cycle so that NAND gates 22 and 23 will be disabled until after lower priority grant flip-flop 31 has had time to set if its ask flip-flop 11 is set so that the Q-bar output signal CPGRNT— can become a binary ZERO and disable NAND gates 22 and 23 before signal RECYCL+ becomes a binary ONE and partially enables them. Thus, the setting of a lower priority grant flip-flop will disable higher priority NAND gates 22 and 23 during the complete priority resolution cycle be it a normal or inverse priority operation.

NAND gates 41 and 42 along with NOR gates 51, 52 and 53 are used to determine which of the three priority levels has actually (really) won the shared resource. The output of NAND gate 41 or 42 will be a binary ZERO if its corresponding grant flip-flop is set and no grant flip-flop associated with a higher priority request is set. For example, the output of NAND gate 41, signal CPMWIN— will be a binary ZERO Indicating that the CPU is the highest priority device making a request for the shared resource if CPU grant flip-flop 31 is set and if I/O grant flip-flop 32 and refresh grant flip-flop 33 are not set. Similarly, the output of NAND gate 42, signal IOMWIN—, will be a binary ZERO indicating that that I/O request is the highest priority request of the shared resource if I/O grant flip-flop 32 is set and refresh grant flip-flop 33 is not set. Because the refresh request is the highest priority requester, there is no NAND gate associated with the output of refresh grant flip-flop 33 and the Q-bar output of refresh grant flip-flop 33, signal RFGRNT—, is used directly and will be a binary ZERO if the refresh request is the highest priority requester for the shared resource.

Because the number of logical elements in the priority resolution path for each priority level is not the same, (i.e., there is no NAND gate between CP ask flip-flop 11 and CP grant flip-flop 31 and there is no NAND gate after refresh grant flip-flop 33) and because the signal propagation time within the individual electronic components of the same type varies within certain tolerances, the output of NAND gates 41 and 42 and grant flip-flop 33 cannot be used directly to determine who the ultimate winner of the shared resource is in cases where there is more than one ask flip-flop 11, 12 and 13 set at the beginning of a priority resolution cycle. For example, assume that both an I/O device has made a request, so that I/O ask flip-flop 12 is set, and that the memory desires to perform a memory refresh cycle, so that refresh ask flip-flop 13 is also set, at the beginning of a priority resolution cycle. At the end of all priority resolution cycles, grant flip-flop 31, 32 and 33 are reset by signal RESETG— becoming a binary ZERO. Before the beginning of the next normal priority resolution cycle, signal RECYCL+ becomes a binary ONE partially enabling NAND gates 22 and 23. At the beginning of a priority resolution cycle, signal RESETG— becomes a binary ONE allowing grant flip-flop 31, 32 and 33 to be set if their set (S) input is a binary ZERO. With grant flip-flops 31, 32 and 33 in the reset state, the signal at their Q-bar output, signal CPGRBNT—, IOGRNT—, and RFGRNT—, respectively, will each be a binary ONE. With signal IOASKM+ being a binary ONE at the Q output of I/O ask flip-flop 12, all of the three inputs to NAND gate 22 are in the binary ONE state. Similarly, with signal RFASKM+ at the Q output of refresh ask flip-flop 13 being in the binary ONE state, all of the four inputs to NAND gate 23 are in the binary ONE state. Thus, signal IOSETG— at the output of NAND gate 22 will become a binary ZERO at approximately the same time that signal RFSETG— becomes a binary ZERO at the output of NAND gate 23. These binary ZEROs will respectively set their corresponding grant flip-flops 32 and 33 after signal RESETG— becomes a binary ONE at their reset (R) input at the beginning of a priority resolution cycle.

Continuing the example, if I/O grant flip-flop 32 is a little faster in setting than refresh grant flip-flop 33, signal IOGRNT+ and IOGRNT— at the outputs of I/O grant flip-flop 32 will become a binary ONE and a binary ZERO, respectively, slightly ahead of signal RFGRNT— becoming a binary ZERO at the output of refresh grant flip-flop 33. The binary ZERO of signal IOGRNT— will disable NAND gate 23 and cause its output, signal RFSETG—, to become a binary ONE but this will not prevent refresh grant flip-flop 33 from setting because the binary ZERO at its set (S) input will have had sufficient time to cause it to set. With signal IOGNT+ becoming a binary ONE, while signal RFGRNT— remains binary ONE, the output of NAND gate 42, signal IOMWIN—, will become a binary ZERO indicating that the I/O request may win the shared resource. When refresh grant flip-flop 33 finally sets slightly after I/O grant 32, signal RFGRNT— will become a binary ZERO thus disabling NAND gate 42 and causing its output, signal IOMWIN—, to become a binary ONE while signal RFGRNT— signal from refresh grant flip-flop 33 becomes a binary ZERO indicating that the refresh request is the highest priority request for the shared resource. Thus, it can be appreciated that the output of NAND gates 41 and 42 and refresh grant flip-flop 33, which indicates the highest priority requester, may change within a given priority resolution cycle. Thus, in either a normal or inverse priority resolution cycle, the early outputs indicate a possible winner the shared resource while the later outputs indicate the real winner. These may win signals output and NAND gates 41 and 42 can be used advantageously to begin steering other signals within the memory before the real winner is determined.

NAND gates 41 and 42 have as one input the Q output signal of their associated grant flip-flop and as other inputs the Q-bar output of all higher priority grant flip-flops. Thus, the NAND gate 41 has as inputs the Q output of CP grant flip-flop 31, which is signal CPGRNT+, the Q-bar output of I/O grant flip-flop 32, which is signal IOGRNT—, and the Q-bar output of refresh grant flip-flop 33, which is signal RFGRNT+.

The output of NAND gate 40 is used to indicate that there is at least one legitimate request for use of the shared resource. NAND gate 40 is connected to the Q-bar output of each of the grant flip-flops 31, 32 and 33 and therefore if any grant flip-flop is set, making its Q-bar output signal a binary ZERO, the output of NAND gate 40, signal MCYCLE+, will become a binary ONE indicating that a legitimate request is coming for the shared resource. The output for NAND gate 40 transistions to the binary ONE state in response to the setting of any one of the grant flip-flops and can therefore be used to initiate a cycle within the shared resource even before the final priority winner is determined. Thus, in the preferred embodiment, the output of NAND gate 40, signal MCYCLE+, when it transitions to the binary ONE state, is used to initiate the beginning of a memory cycle even before the ultimate user of the memory is determined.

The output of NAND gate 40, signal MCYCLE+, is delayed by a multiple tap delay 71 a sufficient time to produce signal MCYCD1+, which is inverted by inverter 72 to produce signal MCYCD1—, which allows all of the grant flip-flops 31, 32 and 33 to set that eventually will set within any given priority resolution cycle. In a preferred embodiment where the setting time of the grant flip-flops is approximately 5 nanoseconds and the propagation delay within NAND gates 22 and 23 is also approximately 5 nanoseconds, the time delay within delay 71 to produce signal MCYCD1+ is approximately 50 nanoseconds. This delay time of 50 nanoseconds is dependent upon the type of circuits used for grant flip-flops 31, 32 and 33.

This delay time must be sufficient to allow the outputs of grant flip-flops 31, 32 and 33 to stabilize in response to any set pulse-having a width of less than the minimum specified for the grant flip-flops. These below specification set pulses on the set (S) inputs of grant flip-flops 32 and 33 can arise because a late setting ask flip-flop 12 or 13 can cause a short set pulse to be output by NAND gate 22 or 23, respectively, until the NAND gate is disabled by the Q-bar output of lower priority grant flip-flops 31 or 32, respectively.

Figure 4:
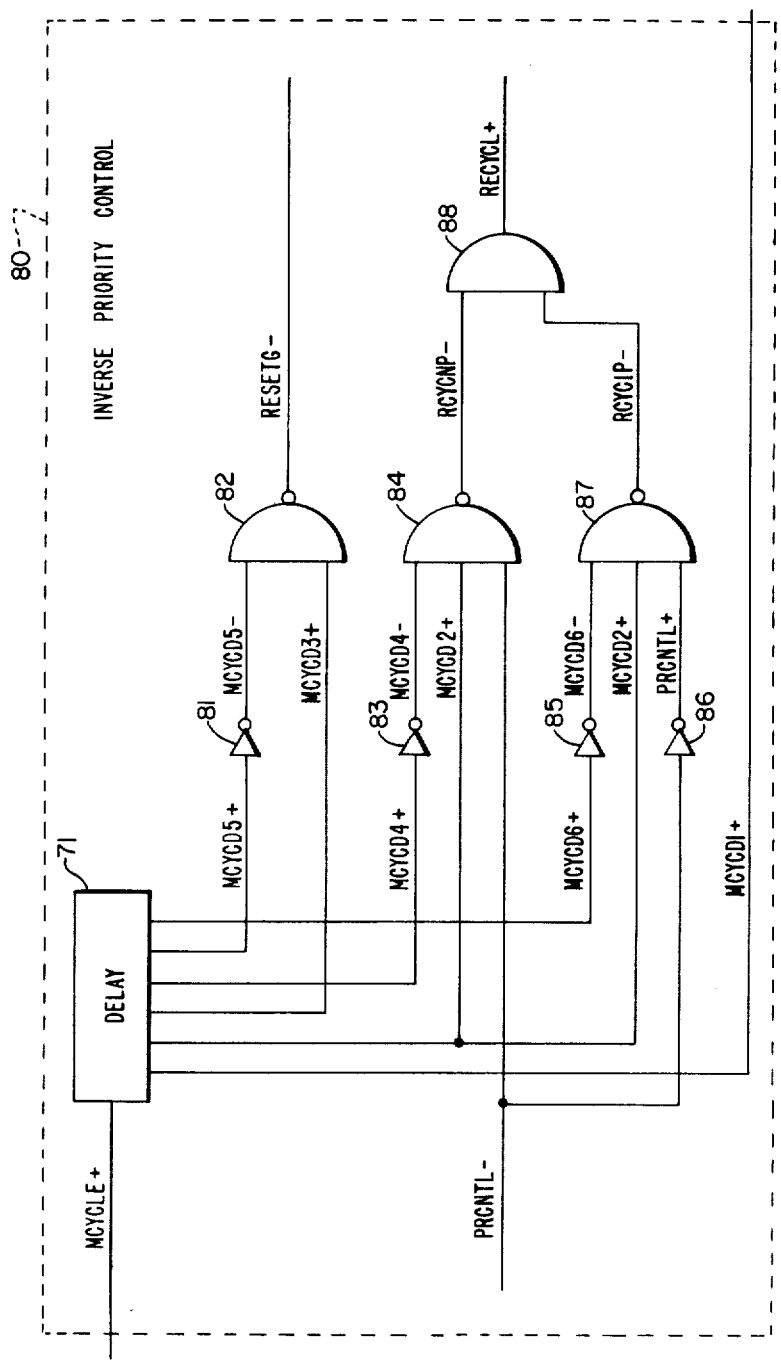
FIG. 4 is a logic block diagram of the inverse priority control logic shown in FIG. 2.
Figure 5:
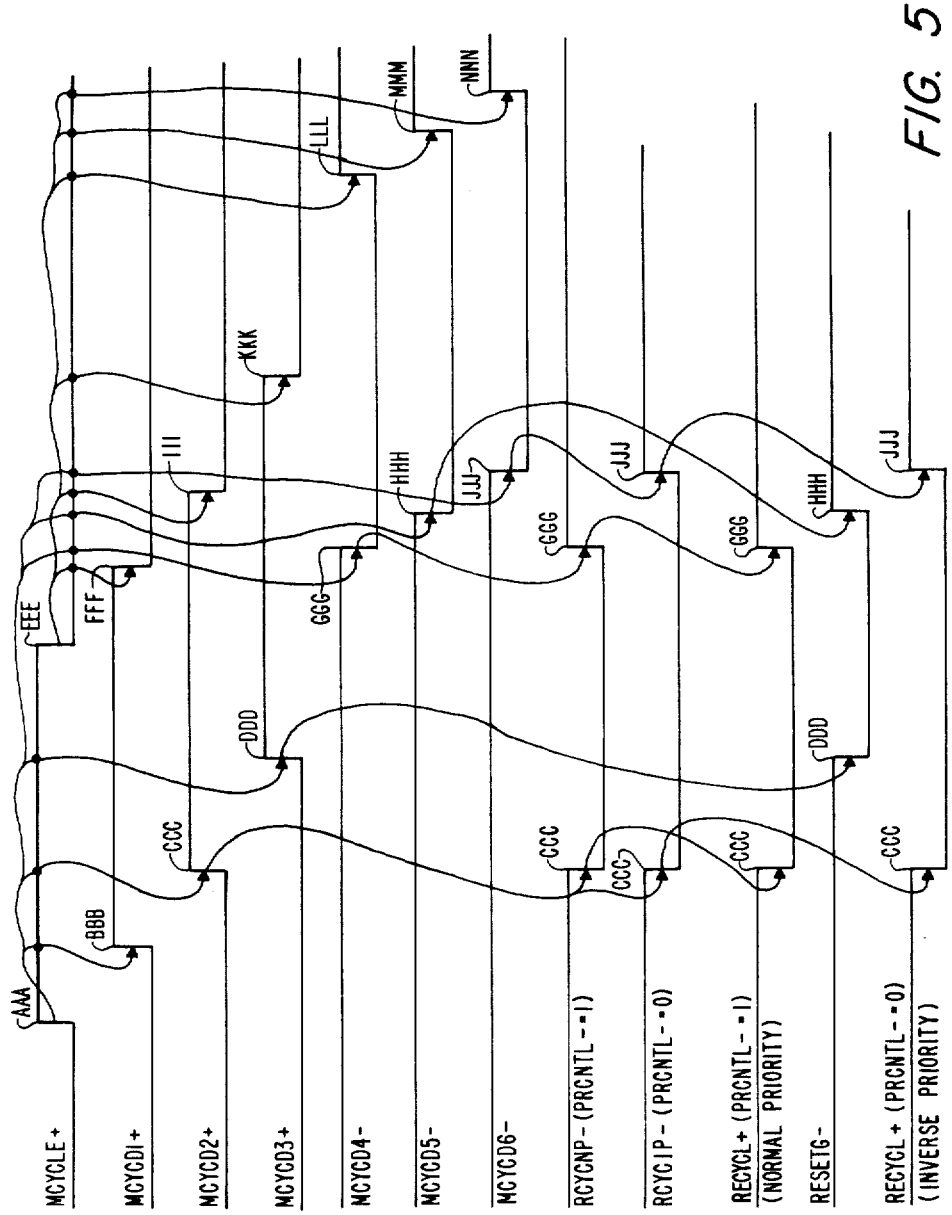
FIG. 5 illustrates a timing diagram of the various signals as they propagate through the inverse priority control logic of FIG. 4.

Fifty nanoseconds after signal MCYCLE+ transistions to the binary ONE state, signal MCYCD1+ at the first output of delay 71 transitions to the binary ONE state (see FIGS. 4 and 5).

Signal MCYCD1+ is inverted by inverter 72 to produce signal MCYCD1—. Signal MCYCD1— is one input to NOR gates 51, 52 and 53. The other inputs to NOR gates 51, 52 and 53 are signal CPMWIN— from NAND gate 41, signal IOMWIN— from NAND gate 42, and signal RFGRNT— from refresh grant flip-flop 33 respectively. When signal MCYCD1— transitions from the binary ONE to the binary ZERO state near the beginning of a memory cycle after allowing sufficient time for grant flip-flops 31, 32 and 33 to set and for their output to propagate through NAND gates 41 and 42, the output of NOR gates 51, 52 and 53 will be determined only by their other inputs, signal CPMWIN—, signal IOMWIN—, and signal RFGRNT—respectively.

At this point in time only one of signals CPMWIN—, IOMWIN— and RFGRNT— will be a binary ZERO and the other two will be binary ONEs. The signal that is a binary ZERO corresponds to the priority level that has the highest priority level requesting use of the shared resource. The output of NOR gates 51, 52 and 53 which has two binary ZEROs as inputs will be a binary ONE indicating that the associated priority level has won use of the shared resource and the output of the other two NOR gates will be binary ZEROs indicating that their associated priority levels have not won use of the shared resource.

For example, if I/O grant flip-flop 32 is set and CP grant flip-flop 31 and refresh grant flip-flop 33 are not set, the output of NAND gate 42, signal IOMWIN—, will be a binary ZERO and cause the output of NOR 52, signal IORWON+, to be a binary ONE indicating that the I/O request is the highest priority level requesting use of the shared resource during this priority resolution cycle and therefore the memory cycle which has already begun will be used by the I/O request which was made via common bus 107.

The outputs of NOR gates 51, 52 and 53 are inverted by inverters 61, 62 and 63 respectively producing signals CPRSET—, IORSET—, and RFRSET— respectively. These reset signals are fed back to the reset (R) input of their corresponding ask flip-flop 11, 12 and 13 so that the device that has won use of the shared resource during this priority resolution cycle will reset its corresponding ask flip-flop thereby allowing a subsequent request from that device to be made for the shared resource.

For example, assuming that during a normal priority operation, the I/O request was the highest priority request and therefore IORWON+ at the output of NOR gate 52 is a binary ONE, the output of inverter 62, signal IORSET—, will become a binary ZERO which when present at the reset input of I/O ask flip-flop 12 will reset the flip-flop. Signal IORSET— will return to the binary ONE state thus allowing I/O ask flip-flop 12 to be set by request signal IOREQT+ at the clock input of I/O ask flip-flop 12 when the I/O grant flip-flop 32 is reset by signal RESETG— becoming a binary ZERO.

From the above discussion it can be appreciated that ask flip-flops 11, 12 and 13 are used to store requests for use of the shared resource by their associated device, that grant flip-flops 31, 32 and 33 are used to produce a glitch-free signal indicating that the corresponding priority level may be granted access to the shared resource during this priority resolution cycle. These grant flip-flops are reset during each resolution cycle. During both normal and inverse priority operations, NAND gates 22 and 23 are used to inhibit a late arriving, higher priority request from changing the award of the shared resource after the priority resolution cycle has begun. NAND gates 22 and 23 are also used during an inverse priority operation to allow lower priority grant flip-flops to set before the output of a higher priority ask flip-flop is allowed to set its corresponding grant flip-flop. The output of NAND gate 40 is used to indicate that the shared resource is about to be allocated to a requester and that the shared resource may begin a cycle. The output of NOR gates 51, 52 and 53 is used to indicate which priority level has really won the use of the shared resource.

It should be noted that the lack of a NAND gate between the Q-bar output of CP ask flip-flop 11 and the set (ask) input of CP grant flip-flop 31 causes no problem. If a priority resolution cycle has already begun because of either an I/O request or a refresh request, a late arriving CP request will set CP ask flip-flop 11 which in turn will cause CP grant flip-flop 31 to set irrespective or where in the priority resolution cycle the CPU request comes in (unless signal RESETG— at the reset (R) input of CP grant flip-flop 31 is in the binary ZERO state). This late setting of CP grant flip-flop 31 will not cause the CPU to win the shared resource even though CPGRNT— becomes a binary ONE, the output of NAND gate 41 will not change because at least one of the higher priority grant flip-flops 32 or 33 will be set causing at least one of signals IOGRNT— and RFGRNT— to be a binary ZERO.

The absence of a NAND gate between the ask flip-flop and the grant flip-flop in logic path of the lowest priority level has the advantage that the lowest priority requester can initiate a request for the shared resource in the shortest time. Thus, a CPU request will result in the initiation of a memory cycle in less time than will an I/O or refresh request made at the same time. Within the data processing system of the preferred embodiment, this results in the speed-up of program execution because the CPU will be idle for less time while waiting for the main memory to do the requested operations.

Although the above description discusses the primary operation of the priority resolver logic 108 illustrated in FIG. 2, there is a further aspect which in the preferred embodiment is associated with CPU requests for the main memory. In the preferred embodiment, data is transferred between the CPU 101 and volatile RAM array 110 of main memory 102 via means of an input/output buffer. Data to be written into main memory is placed in this input/output buffer by the CPU and data that is read out of main memory on behalf of the CPU is placed in this input/output buffer by volatile RAM array 110.

Signal MEBUSY+ at the output of OR gate 70 is used to indicate to the CPU when the data in the input/output buffer has been taken by the main memory during a write into memory operation and when it has been placed in the input/output buffer by the main memory during a read operation and is therefore available to the CPU. When signal MEBUSY+ is a binary ONE it indicates to the CPU that the memory operation has not been completed on behalf of the CPU. Signal MEBUSY+ is derived by ORing the Q output of CP ask flip-flop 11 and CP grant flip-flop 31. If either flip-flop 11 or 31 is set, it indicates to the CPU that the main memory has not completed the operation on behalf of the CPU. Thus, if CP ask flip-flop 11 is still set it indicates that the main memory has other requests and that the CPU request has not yet become the highest priority memory request outstanding.

Because CP ask flip-flop 11 is reset relatively near the beginning of a memory cycle by signal CPRSET— becoming a binary ZERO early in a memory cycle when the CPU has actually won the main memory, the output of CP grant flip-flop 31 is also ORed with the output of CP ask flip-flop 11 because the CP grant flip-flop 31 is reset near the end of the memory cycle whether or not the CPU has been granted the main memory. Therefore, it is only when both the CP ask flip-flop 11 and the CP grant flip-flop 31 have been reset that the CPU can be sure that the input/output buffer is available for use when the signal MEBUSY+ becomes a binary ZERO. A similar method could be used by ORing the outputs of I/O ask flip-flop 12 and I/O grant flip-flop 32 to determine when data has become available to common bus 107.

In the preferred embodiment, information is usually read from and written into main memory a word at a time where a word consists of a two 8-bit bytes. However, information may also be written into main memory a byte at a time. When words of information are accessed on behalf of the CPU, the input/output buffer becomes available about three-fourths of the way through the memory cycle. That is, when a word of information is to be written into the main memory on behalf of the CPU, the memory word is taking from the input/output buffer between the CPU and main memory about three-fourths of the way through the memory cycle thus freeing up the input/output buffer for its next use by the CPU. Alternatively, if a word of information is being read from memory on behalf of the CPU, the information becomes available in the CPU input/output buffer at approximately three-fourths of the way through the memory cycle thus allowing the CPU to begin processing the word from memory. However, when a byte of information is written into the main memory on behalf of the CPU, the byte of data is only taken from the input/output buffer toward the end of the memory cycle and therefore the input/output buffer is not freed up until near the end of the memory cycle.

To take advantage of this early freeing up of the input/output buffer during word access operations, logic is provided to reset CP grant flip-flop 31 approximately three-fourths of the way through a memory cycle during non-byte write operations. This is done by signal DATVAL+ transistioning from the binary ZERO the binary ONE state at the clock (C) input of CP grant flip-flop 31 approximately three-fourths of the way through a memory cycle. Signal DATVAL+ is derived by delaying signal MCYCLE+ approximately three-fourths of the time of a complete memory cycle. Both the binary ZERO to binary ONE transition and the binary ONE to binary ZERO transition of signal DATVAL+ are derived by delaying the binary ZERO to binary ONE transition of signal MCYCLE+ (see FIG. 3) by logic not shown in FIG. 2. That is, both the rising and falling edges of signal DATVAL+ are derived from the rising edge of signal MCYCLE+. This clocking signal is used to clock signal CPREST− at the data (D) input of CP grant flip-flop 31. If signal CPREST− is a binary ZERO, then when it is clocked into CP grant flip-flop 31, it will reset grant flip-flop 31 and thus make signal MEBUSY+ at the output of OR gate 70 a binary ZERO thereby indicating that the memory is no longer busy on behalf of the CPU and that the input/output buffer is free to be loaded with more data to be written into the memory or data read from the memory is available in the input/output buffer for processing by this CPU. Thus, during a non-byte write operation, CP grant flip-flop 11 will be reset relatively early within the memory cycle by signal CPRSET− becoming a binary ZERO and CP grant flip-flop 31 will be reset three-fourths of the way through the cycle by signal DATVAL+ transitioning to the binary ONE state and clocking the binary ZERO at the data input.

Signal CPRSET− is derived by ANDing together signal CPGRNT+ and signal WRBYTE+ by AND gate 20. Signal CPGRNT+ will be a binary ONE if the CP ask flip-flop 11 was set. WRBYTE+ will be a binary ONE if a memory write byte operation is being performed. Signal CPGRNT+ will be a binary ZERO if CP grant flip-flop 31 is not set, indicating that CP ask flip-flop 11 is not set. Signal WRBYTE+ will be a binary ZERO if a word read or write operation is being performed.

Thus, if CP ask flip-flop 11 is set, the output of AND gate 20 will be determined solely by the signal WRBYTE+ which will be a binary ONE if a byte write operation is being performed thus making the signal CPREST− a binary ONE which when clocked into CP grant flip-flop 31 by signal DATVAL+ three-fourths of the way through the memory cycle will result in the CP grant flip-flop 31 not being reset. However, if a word operation is being performed, signal WRBYTE+ will be a binary ZERO, and, when clocked into CP grant flip-flop 31 by signal DATVAL+ three-fourths of the way through a memory cycle, will result in the early resetting of CP grant flip-flop 31 and the early indication to the CPU that the input/output buffer is free by signal MEBUSY+ becoming a binary ZERO.

During a byte write operation, the early clocking of signal CPREST− by signal DATVAL+ three-fourths of the way through a memory cycle will not reset CP grant flip-flop 31 and it will be reset along with I/O grant flip-flop 32 and refresh grant flip-flop 33 by signal RESETG− becoming a binary ZERO at the end of the memory cycle. At this time, signal MEBUSY+ will also become a binary ZERO indicating to the CPU that the input/output buffer is now free.

Only the lowest priority grant flip-flop can be reset early because the early resetting of a higher priority grant flip-flop would change the results of the priority resolver by changing the output of NAND gates 41 or 42.

The inverse priority control logic 80 of FIG. 2 will now be discussed with reference to the detailed logic block diagram of FIG. 4 and the timing diagram of FIG. 5. In FIG. 4, inverse priority control logic 80 is used to produce signals RESETG−, RECYCL+ and MCYCD1+ which are used by the logic of FIG. 2.

The main purpose of inverse priority control logic 80, besides producing these signals, is to control whether signal RECYCL+ becomes a binary ONE before or after signal RESETG− becomes a binary ONE at the beginning of a priority resolution cycle. When priority control signal, PRCNTL− is a binary ONE, signal RECYCL+ will become a binary ONE before signal RESETG− becomes a binary ONE and a normal priority resolution cycle will take place. If priority control signal PRCNTL− is a binary ZERO, signal RECYCL− will become a binary ONE after signal RESETG− becomes a binary ONE and an inverse priority resolution cycle will take place (see FIG. 5).

Multitap delay 71, which has 6 taps, is used to produce signals MCYCD1+, MCYCD2+, MCYCD3+, MCYCD4+, MCYCD5+, and MCYCD6+ by delaying signal MCYCLE+ from the logic in FIG. 2.

In FIG. 5, the propagation time within inverters 81, 83, 85 and 86 and NAND gates 82, 84 and 87 and AND gate 88 is assumed to be ZERO in order to simplify the diagram. Signal MCYCLE+ from FIG. 2 becomes a binary ONE at time AAA and a binary ZERO at time EEE. As this signal propagates through delay 71, signal MCYCD1+ becomes a binary ONE at time BBB and a binary ZERO at time FFF, signal MCYCD2+ becomes binary ONE at time CCC and a binary ZERO at time III nd signl MCYCD3+ becomes a binary ONE at time DDD and a binary ZERO at time KKK. Signal MCYCLE+ is further delayed by delay 71 such that when its various outputs are inverted by inverters 81, 83 and 85, respectively, signal MCYCD4— becomes a binary ZERO at time GGG and a binary ONE at time LLL, signal MCYCD5— becomes a binary ZERO at time HHH and a binary ONE at time MMM, and signl MCYCD6— becomes a binary ZERO at time JJJ and a binary ONE at time NNN.

Signal RESETG—, which is used to control the beginning of a priority resolution cycle, be it a normal or inverrse priority operation, is produced by NAND gate 82 combining signl MCYCD3+ and signal MCYCD5—. At time DDD, signal RESETG— becomes a binary ZERO in response to signal MCYCD3+ becoming a binary ONE. At time HHH, signal RESETG— becomes binary ONE in response to signal MCYCD5— becoming a binary ZERO. As discussed above and as will be seen in the discussion of FIG. 3, when signal RESETG— becomes a binary ZERO, grant flip-flops 31, 32 and 33 are free to be set and a new priority resolution cycle begins.

Normal priority recycle signal RCYCNP— is produced by NAND gate 84 combining signls PRCNTL—, MCYCD2+ and MCYCD4—. During a normal priority resolution cycle, which is controlled by signal PRCNTL— being binary ONE, signal RCYCNP— becomes a binary ZERO at time CCC in response to signal MCYCD2+ becoming a binary ONE and signal RCYCNP— becomes a binary ONE at time GGG in response to signal MCYCD4— becoming a binary ZERO. During an inverse priority resolution cycle, signal PRCNTL— is a binary ZERO and causes signal RCYCNP— to be a binary ONE.

During an inverse priority resolution cycle, inverse priority recycle signl RCYCIP—, which is controlled by signal PRCNTL— being a binary ZERO, becomes a binary ZERO at time CCC in response to signal MCYCD2+ becoming a binary ONE and signal RCYCIP— becomes a binary ONE at time JJJ in response to signal MCYCD6— becoming a binary ZERO. During a normal priority resolution cycle when priority control signal PRCNTL— is a binary ONE, signal RCYCIP— is a binary ONE.

AND gate 88 produces recycle signal RECYCL+ by combining normal priority recycle signal RCYCNP— and inverse priority recycle signal RCYCIP—. During both normal and inverse priority operations, recycle signal RECYCL+ becomes a binary ZERO at time CCC. During a normal priority resolution cycle, when signal RCYCIP— remains a binary ONE, the output of AND gate 88 is controlled by signal RCYCNP— such that signal RECYCL+ becomes a binary ONE at time GGG. During inverse priority resolution cycles, when signal RCYCNP— remains a binary ONE, the output of AND gate 88 is controlled by signal RCYCIP— and therefore signl RECYCL+ becomes a binary ONE at time JJJ.

By examining FIGS. 5 and 2, it can be appreciated that during a normal priority resolution cycle recycle signal RECYCL+ becomes a binary ONE and enables NAND gates 22 and 23 before signl RESETG— becomes binary ONE at the inputs of grant flip-flops 31, 32 and 33 thereby beginning a priority resolution cycle. During an inverse priority operation, recycle signal RECYCL+ becomes a binary ONE after the priority resolution cycle has begun by signal RESETG— becoming a binary ONE thereby allowing a lower priority grant flip-flop to set and disable NAND gates 22 and 23 before they have been partially enabled by signal RECYCL+ thus blocking the output of their associated ask flip-flops 12 and 13, respectively, and preventing grant flip-flops 32 and 33 from setting if a lower priority grant flip-flop has set. Thus, during an inverse priority resolution cycle, the lowest priority requester becomes the highest priority requester precedence over the normally higher priority request.

The logic used to generate priority control signal PRCNTL— is not shown in FIGS. 2 or 4. Normally, signal PRCNTL— is binary ONE such that priority resolver logic 108 will resolve priorities is the normal order with the refresh having the highest priority and the CPU having the lowest priority. However, if conditions arise such that the CPU needs to become the highest priority requester, the logic which detected this condition would set signal PRCNTL— to a binary ZERO making the CPU the highest priority requester followed by refresh being the next priority requester and the I/O being the lowest priority requester. As indicated above, a situation calling for the CPU to become the highest priority requester could come about if the CPU begins perforiming an operation that has real time constraints on it that are more demanding of those of either refreshing or other input/output operations. For example, if the CPU was performing input/output operations to a very high speed disk in which the data transfers were being controlled by the CPU, the CPU might want to become the highest priority device during the transfer.

A simple example of logic that could be used to generate priority control signal PRCNTL— is a D-type flip-flop with its data (D) input connected to the Q output of CP ask flip-flop 11 to receive signal CPASKM+. By connecting the clock (C) input of this flip-flop to receive the output of NAND gate 40, signal MCYCLE+, the Q-bar output of his flip-flop could be used as signal PRCNTL+. The reset (R) input of this flip-flop would be connected to receive signal CPRSET— from inverter 64 in a fashion similar to CP ask flip-flop 11. The use of this logic to control the reversing of the priority order would result in the CPU becoming the highest priority requester in a second cycle if the CPU did not win the memory during a first cycle.

This logic works as follows. The priority control flip-flop would normally be in the reset state such that its Q-bar output would be a binary ONE therefore calling for a normal priority reolution cycle. After one or more requests are made by clocking the various ask flip-flops, one grant flip-flop will be set and signal MCYCLE+ will transition from the binary ZERO to the binary ONE state clocking the priority control flip-flop. If at the time that this priority control flip-flop is clocked, the CPU has made a request, the output of CP ask flip-flop, signal CPASKM+, will be a binary ONE and the priority control flip-flop will be set making its output, signal PRCNTL—, a binary ZERO. If the CPU has not made a memory request by the time signal MCYCLE+ becomes a binary ONE, the priority control flip-flop will not be set and the next priority resolution cycle will be a normal priority resolution cycle. If the priority control flop was set because CP ask flip-flop 11 was set at the beginning of memory cycle, when signal MCYCLE+ becomes a binary ONE, the priority control flop will be reset by signal CPRSET— becoming a binary ZERO at its reset input if the CPU really wins the memory cycle. If the CPU does not really win the memory cycle, the priority control flip-flop will remain set and its Q-bar output, signl PRCNTL—, will remain a binary ZERO causing the next priority resolution cycle to be an inverse priority resolution cycle. This will guarantee that the CPU will win access to the memory and will result in the resetting of CP ask flip-flop 11 and the priority control flip-flop when signl CPRSET— becomes a binary ZERO. Thus, this logic will provide that the CPU will become the highest priority requester during a second cycle if it missed during a first cycle and will result in its resuming its normal priority position in a third cycle.

As an altenative to this method, the priority control signal could be generated by the output of a counter which is clocked by signal MCYCLE+ and incremented each time that the memory is awrded while a CPU request is present as indicated by an output of CP ask flip-flop 11. The counter would be reset each time the memory is awarded to the CPU. This would keep the CPU from being continually blocked by higher priority requests by raising the priority level of the CPU once a predetermined threshold is reached by the counter.

Figure 3:
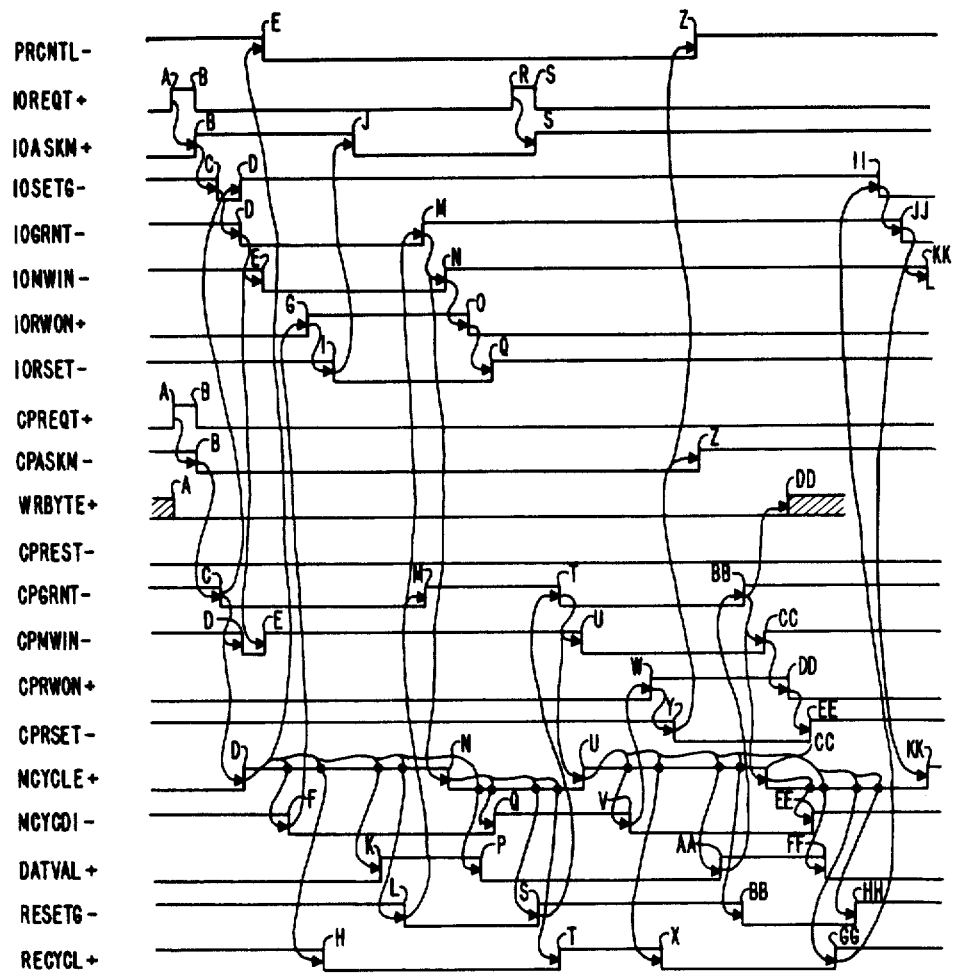
FIG. 3 illustrates a timing diagram of the various signals as they propagate through the priority resolver logic of FIG. 2.

The priority resolution logic of FIG. 2 will now be discussed with reference to the timing diagram of FIG. 3 which shows the priority resolution between two competing requests for main memory. FIG. 3 illustrates the case in which a CPU request and an I/O request for the main memory arrive simultaneously. FIG. 3 illustrates two priority resolution cycles. During the first cycle normal priority is used (i.e., refresh, then I/O, then CPU), and during the second cycle the CPU inverse priority is used in which the CPU has highest priority (i.e., CPU, then refresh, then I/O). In FIG. 3, the propagation time within the logic elements such as flip-flops, NAND gates, OR gates and NOR gates is all assumed to be of equal time in order to simplify the diagram.

Starting conditions for the case illustrated in FIG. 3 are such that any previous memory cycle or priority resolution cycle has been completed and all ask flip-flops 11, 12 and 13 are reset as are all grant flip-flops 31, 32 and 33. Signal PRCNTL— is a binary ONE and a normal priority resolution cycle will take place. Because signal CPGRNT+ is a binary ZERO at the output of CP grant flip-flop 31, the output of AND gate 20, signal CPREST—, is a binary ZERO at the dat (D) input of CP grant flip-flop 31. In addition, signal RECYCL+ is a binary ONE such that NAND gates 22 and 23 are partially enabled and grant flip-flop reset signal RESETG— is a binary ONE.

In FIG. 3, at time A both an I/O controller and a CPU make simultaneous requests for use of the main memory, the shared resource, by the signals IOREQT+ and CPREQT+ transitioning from the binary ZERO to the binary ONE state. Signal WRBYTE+ also is set by the CPU to indicate that the type of memory operation to be performed on behalf of the CPU is not a byte write operation.

These request signals set their corresponding ask flip-flops such that I/O ask flip-flop 12 is set causing its Q output, signal IOASKM+, to transition from the binary ZERO to the binary ONE state and CP ask flip-flop is set causing its Q-bar output, signal CPASKM—, to transition from the binary ONE to the binary ZERO state at time B. Also, at time B, the request pulses IOREQT+ and CPREQT+ return to the binary ZERO state.

At time C, NAND gate 22 is fully enabled causing its output, signal IOSETG—, to transition from the binary ONE to the binary ZERO state and, at the same time, CP grant flip-flop 31 becomes set causing its output signal, signal CPGRNT—, to transition from the binary ONE to the binary ZERO state. At this point, CP grant flip-flop 31 has already set whereas the binary ZERO to set I/O grant lip-flop 32 has just become available at its set (S) input.

At time D, NAND gate 22 becomes disabled by the signal CPGRNT— being a binary ZERO thus causing its output, signal IOSETG—, to transition from the binary ZERO to the binary ONE state and, at the same time, I/O grant flip-flop 32 becomes set causing its output, signal IOGRNT, to transition from the binary ONE to the binary ZERO state. Also at time D, the binary ZERO of signal CPGRNT— has propagated through NAND gate 40 causing its output, signal MCYCLE+, to transition from the binary ZERO to the binary ONE stte thus signalling the beginning of a memory cycle, in which one of the three devices will need access to the memory. This early signalling allows memory to begin a memory cycle even before the ultimate (real) winner is determined. This example illustrates that the lowest priority level has the shortest logic path for purposes of initiating a memory cycle because signal MCYCLE+ became a binary ONE in response to the setting of CP grant flip-flop 31 and not in response to the setting of I/O grant flip-flop 32 which is yet to set and will eventually win the memory cycle. Simultaneously with this at time D, the binary ONE of ignal CPGRNT+ has propagated through NAND gate 41 causing its output signal, CPMWIN—, to transition from the binary ONE to the binary ZERO state indicating that the CPU may win access to the shared resource. Therefore, at time D, both CP grant flip-flop 31 and I/O grant flip-flop 32 are set and a main memory cycle has been initiated.

In this example illustrated in FIG. 3, it will be assumed that priority control signal PRCNTL— is generated by the Q-bar output of inverse priority control a lip-flop (not shown in FIG. 2 or 4) clocked by signal MCYCLE+ and having as a data (D) input the output of CPU ask flip-flop 11, signl CPASKM+. This inverse priority control flip-flop has its reset (R) input connected to signal CPRSET—. Therefore, at time D, the transition of signal MCYCLE+ from the binary ZERO to the binary ONE state will clock the binary ONE of signal CPASKM+ into the inverse priority control flip-flop.

The clocking of the inverse priority control flip-flop will cause it to set making its Q-bar output, priority control signal PRCNTL—, a binary ZERO. If the CPU does not win this priority resolution cycle, priority control signal PRCNTL— will remain a binary ZERO and cause the next priority resolution cycle to be an inverse priority resolution cycle. At time E, signal IOMWIN— transitions from the binary ONE to the binary ZERO state indicating that the I/O controller may win access to the main memory. This transition is caused by the binary ONE of of signal IOCRNT+ propagating through NAND gate 42. At the same time, the binary ZERO of signal IOGRNT— has propagated through NAND gate 41 causing its output, signal CPMWIN—, to transition from the binary ZERO to the binary ONE state thus indicating that the CPU will not win access to the main memory.

At time F, signal MCYCLE+ has propagated through delay 71 and inverter 72 thus causing the output of inverter 72, signal MCYCD1−, to transition from the binary ONE to the binary ZERO state.

At time G, signal MCYCD1− has propagated through NOR gates 51, 52 and 53 resulting in signal IORWON+ transitioning from the binary ZERO to the binary ONE state, indicating that the I/O controller has really won access to the main memory and that neither the CPU nor the refresh is the winner of the shared resource.

At time H, the binary ZERO to binary ONE transition of signal MCYCLE+ has been delayed and signal RECYCL+ transitions from the binary ONE to the binary ZERO state thus disabling NAND gates 22 and 23 to prevent any late setting of ASK flip-flops 12 and 13, due to late arriving requests, from setting grant flip-flops 32 or 33 once the priority resolution cycle has progressed to this point in time.

At time I, signal IORWON+ has been inverted by inverter 62 and signal IORSET− transitions from the binary ONE to the binary ZERO state thus indicating to I/O ask flip-flop 12 that it should reset. This resetting permits the winning requester to initiate another request for the shared resorce upon completion of the current request.

At time J, I/O ask flip-flop 12 has reset causing its output, signal IOASKM+, to transition from the binary ONE to the binary ZERO state.

At time K, the binary ZERO to binary ONE transition of signal MCYCLE+ has been delayed for approximately ¾ of a memory cycle and signal DATVAL+ transitions from the binary ZERO to the binary ONE state thus clocking CP grant flip-flop 31 so that this grant flip-flop may be reset earlier than would otherwise be done by signl RESETG− transitioning to the binary ZERO state. However, in this case, although signal CPREST− is a binary ZERO at the data (D) input of CP grant flip-flop 31, signal CPASKM− is a binary ZERO at the set (S) input because the CP ask flip-flop 11 is still set and therefore CP grant flip-flop 31 remains set.

At time L, the binary ZERO to binary ONE transition of signal MCYCLE+ has been delayed and signal RESETG− transitions from the binary ONE to the binary ZERO state for use in resetting grant flip-flops 31, 32 and 33.

At time M, both grant flip-flops 31 and 32 have been reset by the binary ZERO signal at their reset (R) inputs thus making their Q-bar outputs, signals CPGRNT− and IOGRNT−, binary ONEs. This resetting of grant flip-flops is done in preparation of beginning new priority resolution cycle to determine the next winner of the shared resource.

At time N, the binary ZERO of signal IOGRNT+ has propagated through NAND gate 42 making its output, signal IOMWIN−, a binary ONE. In addition, the binary ONE of signal IOGRNT− has propagated through NAND gate 40 making its output, signal MCYCLE+, a binary ZERO to indicate the end of a memory cycle.

At time O, the binary ONE of signal IOMWIN− has propagated through NOR gate 52 making its output, signal IORWON+, a binary ZERO.

At time P, the binary ZERO to binary ONE transition of signal MCYCLE+ has been delayed sufficiently such that signal DATVAL+ transitions from the binary ONE to the binary ZERO state.

At time Q, the binary ZERO of signal IORWON+ has propagated through inverter 62 causing its output, signal IORSET−, to transition from the binary ZERO to the binary ONE state. This removes the binary ZERO from the reset (R) input of I/O ask flip-flop thus permitting a subsequent request to set it by signal IOREQT+ transitioning from the binary ONE to the binary ZERO state. If it is desired to allow subsequent requests to set ask flip-flops 11, 12 and 13 sooner in the cycle (i.e., closer to time I when it was reset), logic could be added to return the reset signals CPRSET−, IORSET− and RFRSET− to the binary ONE state sooner in the cycle. Also at time Q, the binary ONE to binary ZERO transition of signal MCYCLE+ has propagated through delay 71 and inverter 72 causing signal MCYCD1− to transition from the binary ZERO to the binary ONE state.

At time R, the I/O makes a second request for the use of memory by pulsing its request signal from the binary ZERO to the binary ONE state. This clocking of I/O ask flip-flop will result in its being set. Note that this clocking of an ask flip-flop can only successfully occur after thw signal at its reset input is no longer a binary ZERO. In this case, signal IORSET− becomes a binary ONE at time Q before time R. The returning of reset signals RFRSET−, IORSET− and CPRSET− to the binary ZERO state sooner than that provided for by the logic of FIG. 2 will allow their corresponding ask flip-flops 13, 12 and 11 to be set that much sooner. This would allow subsequent requests from the requester who has won the shared resource in the current priority resolution cycle to be made earlier in the current priority resolution cycle.

At time S, I/O ask flip-flop 12 has set causing its Q output, signal IOASKM+, to transition from the binary ZERO to the binary ONE state. Also, at time S, the request pulse IOREQT+ returns to the binary ZERO state.

At time S, the binary ZERO to binary ONE transition of signal MCYCLE+ has been delayed by delay 71 as signals MCYCD3+ and MCYCD5− causing the ouput of NAND gate 82. signal RESETG−, to transition from the binary ZERO to the bianary ONE state thus removing the binary ZERO from the reset (R) inputs of grant flip-flops 31, 32 and 33 and thus beginning the next (second) priority resolution cycle which will be an inverse priority cycle because signal RECYCL+ has not yet become a binary ONE to partially enable NAND gates 22 and 23.

At time T, the binary ZERO to binary ONE transition of signal MCYCLE+ has been delayed by delay 71 as signals MCYCD2+ and MCYCD6− causing the output of NAND gate 87, which is partially enabled by signal PRCNTL+ being a binary ONE, to control the output of AND gate 88 and cause signal RECYCL+ to transition from the binary ZERO to the binary ONE state partially enabling NAND gates 22 and 23 for the next priority resolution cycle which has already begun.

As discussed above, it should be noted that the signal RECYCL+ became a binary ONE at time T after signal RESETG− became a binary ONE at time S so that NAND gates 22 and 23 are not enabled in sufficient time to allow their output signals to become binary ZEROs before the next priority resolution cycle, which is an inverse priority cycle, was begun.

At time T, the binary ZERO of signal CPASKM− from CP ask flip-flop 11, which is input to the set (S) input of CP grant flip-flop 31, has resulted in its setting causing its output, signal CPGRNT−, to transition from the binary ONE to the binary ZERO state. Signal CPGRNT− becoming a binary ZERO thus disables NAND gates 22 and 23 just as they were being partially enabled by signal RECYCL+ becoming a binary ONE. This disabling of NAND gates 22 and 23 thus block any requests coming from ask flip-flops 12 or 13 during this inverse priority resolution cycle.

At time U, the binary ONE of signal CPGRNT+ has propagated through NAND gate 41 making its output, signal CPMWIN−, transition from a binary ONE to the binary ZERO state. Also at time U, the binary ZERO of signal CPGRNT− has propagated through NAND gate 40 making its output, signal MCYCLE+, transition from the binary ZERO to the binary ONE state thus indicating the beginning of a memory cycle even though, as yet, the real winner of the shared resource has not been determined. At time U, the transition of signal MCYCLE+ from the binary ZERO to the binary ONE state clocks the binary ONE of signal CPASKM+ into the inverse priority control flop-flop which results in tis remaining set causing its Q-bar output, signal PRCNTL−, to remain a binary ZERO. This will cause the next priority resolution cycle to be an inverse priority cycle unless the priority control flip-flop is reset before the next (third) priority resolution cycle begins.

At time V, the binary ZERO to binary ONE transition of signal MCYCLE+ has propagted through delay 71 and inverter 72 causing signal MCYCD1− to transition from the binary ONE to the binary ZERO state.

At time W, signl MCYCD1− has propagated through NOR gates 51, 52 and 53 resulting in signal CPRWON+ transitioning from the binary ZERO to the binary ONE state indicating that the CPU has really won access to the main memory and that neither the I/O controller nor the refresh is the winner of the shared resource. Thus, even though an I/O request existed at the beginning of this second priority resolution cycle, because this is an inverse priority resolution cycle, the CPU which is normally the lowest priority has won out over all higher priority requests. In this example, only on I/O request was present but the CPU would have also won over a refresh request.

At time X, the binary ZERO to binary ONE transition of signal MCYCLE+ has been delayed and signal RECYCL+ transitions from the binary ONE to the binary ZERO state thus disabling NAND gates 22 and 23 to prevent any late setting of ASK flip-flops 12 or 13, due to late arriving requests, from setting grant flip-flops 32 or 33 once the priority resolution cycle has progressed to this point in time.

At time Y, signal CPRWON+ has been inverted by inverter 61 and signal CPRSET− transitions from the binary ONE to the binary ZERO state thus indicting to the CP ask flip-flop 11 that it should reset. This resetting permits the winning requests to initiate another request for the shared resource upon completion of the current request. As discussed above, the CPU waits until signal MEBUSY+ becomes a binary ZERO (see FIG. 2). Signal CPRSET− becoming a binary ZERO also indicates to the inverse priority control flip-flop that it should reset because the CPU has won the memory and therefore the next priority resolution cycle will be a normal cycle because there is no longer a CPU reuest that lost against a normally higher priority request.

At time Z, CP ask flip-flop 11 has reset causing its output, signal CPASKM−, to transition from the binary ZERO to the binary ONE state. Also at time Z, the inverse priority control flip-flop has reset causing its Q-bar output, signal PRCNTL−, to transition from the binary ZERO to the binary ONE state thus indicating that the next (third) priority resolution cycle is to be a normal priority resolution cycle.

At time AA, the binary ZERO to binary ONE transition of signal MCYCLE+ has been delayed for approximately ¾ of a memory cycle and signal DATVAL+ transitions from the binary ZERO to the binary ONE state thus clocking CP grant flip-flop 31 so that this grant flip-flop may be reset earlier than would otherwise be done by signal RESETG− transitioning to the binary ZERO state. In this case, signal CPREST− is a binary ZERO at the data (D) input of CP grant flip-flop 31 and signal CPASKM− is no longer a binary ZERO at the set (S) input because the CP ask flip-flop 11 has been reset and therefore CP grant flip-flop 31 will reset.

At time BB, the clocking of the binary ZERO at the data (D) input of CP grant flip-flop 31 by signal DATVAL+ has caused it to reset causing its output, signal CPGRNT−, to transition from the binary ZERO to binary ONE state. Also at time BB, the binary ZERO to binary ONE transition of signal MCYCLE+ has been delayed and signl RESETG− transitions from the binary ONE to the binary ZERO state for use in resetting grant flip-flop 31, 32 and 33. This resetting of grant flip-flop is done in preparation of beginning a new priority resolution cycle to determine the next winner of the shared resource.

At time CC, the binary ZERO of signal CPGRNT+ has propagated through NAND gate 41 making its output, signal CPMWIN−, a binary ONE. In addition, the binary ONE of signal CPGRNT− has propagated through NAND gate 40 making its output, signal MCYCLE+, a binary ZERO to indicate the end of a memory cycle.

At time DD, the binary ONE of signal CPMWIN− has propagated through NOR gate 51 making its output, signal CPRWON+, a binary ZERO. By time DD, signal MEBUSY+ (not shown in FIG. 3), which is used by the CPU to determine when the memory is done with a CPU request, has become a binary ZERO in response to the resetting of CP grant flip-flop 31 at time BB. Thus, at time DD, the CPU is free to charge signal WRBYTE+ in preparation for the next CPU memory request, once set, signal WRBYTE+ must not be changed by the CPU until clocking signal DATVAL+ transitions from the binary ZERO to the binary ONE state in the memory cycle being performed on behalf of the CPU.

At time EE, the binary ZERO of signal CPRWON+ has propagated through inverter 61 causing its output, signal CPRSET−, to transition from the binary ZERO to the binary ONE state. Also at time EE, the binary ONE to binary ZERO transition of signal MCYCLE+ has propagated through delay 71 and inverter 72 causing signal MCYCD1− to transition from the binary ZERO to the binary ONE state.

At time FF, the binary ZERO to binary ONE transition of signal MYCYCLE+ has been delayed sufficiently such that signal DATVAL+ transitions from the binary ONE to the binary ZERO state.

At time GG, the binary ZERO to binary ONE transition of signal MCYCLE+ has been delayed and signal RECYCL+ transitions from the binary ZERO to the binary ONE state partially enabling NAND gates 22 and 23 for the beginning of the next (third) priority resolution cycle. The next priority resolution cycle will be a normal priority resolution cycle because NAND gates 22 and 23 were enabled by signal RECYCL+ being a binary ONE before the next cycle begins by signal RESETG− becoming a binary ONE at time HH.

At time HH, the binary ZERO to binary ONE transition of signal MCYCLE+ has been delayed by delay 71 as signals MCYCD2+ and MCYCD4− causing the output of NAND gate 84, which is partially enabled by signal PRCNTL− being a binary ONE, to control the output of AND gate 88 and causes signal RESETG− to transition from the binary ZERO to the binary ONE state thus removing the binary ZERO from the reset (R) inputs of grant flip-flops 31, 32 and 33. This permits next priority resolution cycle to begin if any ask flip-flop is set. In this case, I/O ask flip-flop 12 is set and so a normal priority resolution cycle will begin.

At time II, the binary ONE of signal IOASKM+ will have propagated through NAND gate 22 causing its output, signal IOSETG−, to become a binary ZERO which will set I/O grant flip-flop 32 and cause its output, signal IOGRNT−, to become a binary ZERO at time JJ which in turn will result in the output of NAND gate 42, signal IOMWIN−, becomes a binary ZERO at time KK and memory initiate signal MCYCLE+ becomes a binary ONE. This third priority resolution cycle, which is a normal priority cycle, will continue in much the same way as the first cycle with the I/O winning access to the memory.

In this third priority resolution cycle, the I/O wins because it is the highest (and only) requester. During this third priority resolution cycle, the inverse priority control flip-flop will not be set because the CPU will not lose the third cycle because it is not competing for memory. This third priority resolution cycle will be the last cycle until another request is made and one of the ask flip-flops 11, 12 or 13 gets set.

After the third priority resolution cycle, all ask flip-flops 11, 12 and 13 and all grant flip-flops 31, 32 and 33 will have been reset and the priority resolver logic will wait for the next request to set an ask flip-flop to initiate the next priority resolution cycle.

It should be noted that the ability to invert the priority of the lowest priority level has been done without increasing the length of the logic path of the lowest priority level thus allowing the lowest priority requester to quickly initiate a shared resource cycle without regard as to whether it is a normal or inverse priority resolution cycle.

Although the present invention has been described in terms of the preferred embodiment in which the priority resolution logic resolves priority among three requesters, as indicated above the present invention may be used to resolve priority between two through N requesters.

To reduce the logic to handle two requesters, the logic associated with the refresh request would be eliminated from FIG. 2. That is, refresh ask flip-flop 13, NAND gate 23, refresh grant flip-flop 33, NOR gate 53 and inverter 63 would be eliminated. Further, the RFGRNT− signal from the Q-bar output of refresh grant flip-flop 33 would be eliminated as an input to NAND gate 40. In addition, NAND gate 41 would become a two input NAND gate because signal RFGRNT− would be eliminated and NAND gate 42 would become a one input NAND gate or simply an inverter or eliminated altogether by replacing signal IOMWIN− at the input to NOR gate 52 with signal IOGRNT− which is output at the Q-bar output of I/O grant flip-flop 32.

To extend the logic of FIG. 2 to handle a fourth request, another row of logic similar to the bottom row of logic would be added at the bottom of the diagram. That is, an ask flip-flop 14, a NAND gate 24, a grant flip-flop 34, a NOR gate 54, an inverter 64 would be added to the bottom of the diagram. NAND gate 24 would have as inputs the Q output of ask flip-flop 14 and the Q-bar output of all lower priority grant flip-flops 31, 32 and 33. In addition, the Q-bar output of grant flip-flop 34 would have to added as an input to NAND gates 40, 41 and 42. Further, a NAND gage 43 would have to be added to receive the Q-bar output of grant flip-flop 34 along with the Q output of refresh grant flip-flop 33. The output of NAND gate 43 would replace signal RFGRNT− as an input to NOR gate 53.

From this process of reduction and extension it can be seen that NAND gates of the type 22, 23 and 24 etc., receive as inputs the Q-bar output of all lower priority grant flip-flops; NAND gate 40 receives the Q-bar output of all grant flip-flops and NAND gates of the type 41, 42 and 43 etc., receive as inputs the Q output of its associated grant flip-flop and the Q-bar outputs of all higher priority grant flip-flops.

It will be appreciated that NOR gate 51 and inverter 61 could be eliminated by feeding the output of delay 71, signal MCYCD1+, as an additional input into NAND gate 41. This would make the output of NAND gate 41, signal CPMWIN−, a really won signal, as opposed to a may win signal, and it could be used to reset the CP ask flip-flop 11 instead of signal CPRSET−. Similarly, signal MCYCD1+ could be used as an input to NAND gate 42 and eliminate the need for NOR gate 52 and inverter 62. A NAND gate 43 with inputs of signals RFGRNT+ and MCYCD1+ could be added and eliminate the need for NOR gate 53 and inverter 63. This change, although reducing the number of logic gates, has the disadvantage that the "may win" signals, CPMWIN− and IOMWIN−, which appear earlier than the "really won" signals, CPRWON+, IORWON+ and RFRWON+, are eliminated so that they are not available for use in the early steering of other signals to the memory before the ultimate (real) winner is determined.

Although the present invention has been described in terms of simply raising the priority level of the lowest priority level to be above that of the normal highest and middle priority levels (i.e., to go from a normal order of high, middle, low to and inverse order of low, high, midle) it is possible to raise the priority of the middle and low levels to be above the normal highest priority level. That is, the inverse order could be middle, low, high.

To do this, the logic of FIG. 2 would be modified so that signal RECYCL+ into NAND gate 22 would be replaced by the output of a NAND gate having input signals MCYCD2+ and MCYCD4−. The output of this gate would be the same as signal RCYCNP− in FIG. 5 during both normal and inverse priority resolution cycles. The recycle signal into NAND gate 23 would remain signal RECYCL+ from AND gate 88

(see FIG. 4). This change would result in NAND gate 22 always being partially enabled by the new recycle signal, during both normal and inverse priority resolution cycles, before signal IOSETG— becomes a binary ONE enabling all grant flip-flops to set at the beginning of any priority resolution cycle. Therefore, only the enabling of NAND gate 23 would be delayed until after the beginning of an inverse priority resolution cycle.

The delaying of enabling NAND gate 23 would give both the I/O request and the CPU request priority over the refresh request. During this inverse priority cycle, the I/O request would have priority over the CPU request because both grant flip-flops 31 and 32 would set at the same time if both ask flip-flops 11 and 12 are set. In this case, the setting of I/O grant flip-flop 32 will result in the disabling of NAND gate 41 so the I/O request will win. The setting of either grant flip-flop 31 or I/O grant flip-flop 32 before NAND gate 23 is enabled by delayed signal RECYCL+ becoming a binary ONE will disable NAND gate 23 and inhibit any pending refresh requests from refresh ask flip-flop 13 setting refresh grant flip-flop 33 and thus preventing the normal highest priority request from winning.

The above discussion of inverting priority levels has been in terms of moving one group of low priority levels above one group of high priority levels while the priority levels within each group retain their same relative priority within the group. If more than three priority levels are present, more than two groups could be rearranged in priority order. This could be done by simply having each group have its own controllable recycle signal into the NAND gates between the ask and grant flip-flops. In the multigroup case, the inversion of the priority levels is done by enabling the NAND gates of the group that is to have the highest priority first followed by enabling the NAND gates of the group that is to have the next highest priority and so on until the group that is to have the lowest priority is enabled. While doing this multigroup inverse priority resolution cycle, it is important that the signal MCYCLE+ is delayed sufficiently so that grant flip-flops of the new lowest priority group will have had time to set before signal MCYCD1— becomes a binary ZERO at NOR gates 51, 52, etc., the output of which is used to determine the real winner of the shared resource.

While the invention has been shown and described with reference to the preferred embodiment thereof, it will be understood by those skilled in the art that the above and other changes in form and detail may be made therein without departing from the spirit and scope of the invention.

What is claimed is:

1. An apparatus for resolving priority between competing requests for a shared resource comprising:
    A. a lowest priority level logic comprising:
        a. an ask means for receiving a request signal indicating that the lowest priority desires use of said shared resource,
        b. a grant means coupled to received an output of said ask means,
    B. a highest priority level logic comprising:
        a. an ask means for receiving a request signal indicating that the highest priority level desires to use the shared resource,
        b. a late request inhibit means coupled to receive an output of said ask means,
        c. a grant means coupled to receive a output of said late request inhibit means,
    C. a cycle initiate means coupled to receive an output of said lowest priority level grant means and an output of said highest priority level grant means to produce an initiate signal wherein said initiate signal ouput by said cycle initiate means indicates that at least one of said priority levels is requesting use of said shared resource,
    D. an inverse priority control means coupled to said grant means and said late request inhibit means comprising:
        a. a receiving means for receiving a priority control signal which when in a normal state indicates that a normal priority resolution cycle is to occur and when in an inverse state indicates that an inverse priority resolution cycle is to occur,
        b. a means for generating a late request inhibit signal, and
        c. a means for generating a grant reset signal,
        wherein during said normal priority resolution cycle said late request inhibit signal enables said request inhibit means to pass said request signal before said grant reset signal enables said grant means and wherein during said inverse priority resolution cycle said late request inhibit signal enables said late request inhibit means after said grant reset signal
    E. a delay means for producing a delayed initiate signal by delaying the output of said cycle initiate means a sufficient time to allow any of said grant flip-flops to set that is going to set in a priority resolution cycle.
    F. a lowest priority winner means coupled to receive said output of said priority grant means and the output of said delay means to produce a low win signal that indicates said lowest priority level has won use of said shared resource if no higher priority level grant flip-flop has been set once said delayed initiate signal is produced by said delay means, and
    G. highest priority winner means coupled to receive said output of said highest priority grant means and said delayed initiate signal for producing a high win signal indicating that said highest priority level has won use of said shared resource if said highest priority grant means is set when said delayed initiate signal appears,
wherein said lowest priority level logic has the shortest path to said cycle initiate means and can initiate a shared resource cycle quicker than any other of said priority levels and wherein said initiate signal is produced before a final winner of the shared resource is determined.

2. The apparatus of claim 1 wherein said output of said lowest priority winner means is coupled to an input of said lowest priority ask means to reset said ask means when it has been determined that said lowest priority level has won use of the said shared resource and wherein an output of said highest priority winner means is coupled to an input of said highest priority ask means to reset said ask means if said highest priority level wins access to said shared resource.

3. The apparatus as in claim 2 wherein said inverse priority control means further comprises a late request delay means coupled to said cycle initiate means to produce a late request inhibit signal which is used to disable said late request inhibit means after the beginning of a priority resolution cycle thereby inhibiting any late arriving requests from entering into a priority resolution cycle by preventing the setting of its corresponding grant means and wherein said late request inhibit signal disables said late request inhibit means before said delayed initiate signal appears.

4. The apparatus as in claim 1 wherein said inverse priority control means is coupled to said cycle initiate means to receive said initiate signal and wherein said inverse priority control means produces said late request inhibit signal and said grant reset signal by delaying said initiate signal.

5. The apparatus as in claim 1 further comprising one or more middle priority logic levels comprised of an ask means, a late request inhibit means, a grant means, and a middle winner means.

6. The apparatus as in claim 1 wherein said ouput of said ask means and said output of said grant means are combined by a request done means to produce a signal which indicates that the associated priority level request has been granted and the priority level can now make a subsequent request for the use of said shared resource.

7. The apparatus as in claim 1 wherein the lowest priority level grant flip-flop is reset by an early clocking signal that clocks an early reset signal indicating when in state one that the lowest priority level can now make a subsequent request for said shared resource.

8. The apparatus as in claim 1 wherein said ask means and said grant means are D-type flip-flops.

9. The apparatus as in claim 8 wherein said late request inhibit means is a NAND gate.

10. The apparatus as in claim 9 wherein said cycle initiate means is a NAND gate.

11. The apparatus as in claim 10 wherein said winner means is comprised of a said NAND gate and a NOR gate with the output of said NAND gate being an input into said NOR gate.

12. The apparatus as in claim 11 wherein said request done means is an OR gate.

13. The apparatus as in claim 12 wherein said inverse priority control means comprises a multitap delay and said late request inhibit signal and said grant reset signal are produced by logically combining outputs of said multitap delay and wherein said grant reset signal remains fixed relative to said initiate signal and said enable state of late request inhibit signal moves relative to said non-reset state of said grant reset signal as a function of said priority control signal.

14. A priority resolver having dynamically controllable priority levels for allocating a shared resource, said priority resolver comprising:

A. an ask flip-flop for each priority level that is set by a signal requesting use of said shared resource, wherein said individual ask flip-flops can be set at any time by any one of said priority requests signals and remain set until the associated priority level has won use of said shared resource, and wherein by resetting said ask flip-flop of said winning priority level relatively early within said priority resolution cycle, a subsequent request for said shared resource can be made and the same priority level can compete in the next of said priority resolution cycles, B. a grant flip-flop for each priority level, an output of said individual ask flip-flops is connected to inputs of a corresponding one of said grant flip-flops, said individual grant flip-flops are set during a normal priority resolution cycle if their corresponding ask flip-flop is set at the beginning of said priority resolution cycle and wherein during each of said normal priority resolution cycles, as many grant flip-flops will be set as there are ask flip-flops set at the beginning of said normal priority resolution cycle, wherein all grant flip-flops are reset at the end of each of said priority resolution cycles by a common reset signal, and wherein at the beginning of said next priority resolution cycle is determined by said reset signal returning to a non-reset state, C. an initiate means for combining an output of each grant flip-flops to provide an early shared resource initiate signal that indicates that at least one priority level has requested use of said shared resource even though the final winner has yet to be determined, D. a first gate for receiving an output of each grant flip-flop to partially enable said first gate associated with the priority level, said first gate also coupled to receive an inverted output of all higher priority grant flip-flops, and wherein the individual outputs of said first gate indicate that the associated priority level might win use of said shared resource, E. a delay means producing a delayed initiate signal by delaying said initiate signal a sufficient time to allow all said grant flip-flops that are going to set during said priority resolution cycle sufficient time to set, F. an individual second gate associated with each priority level that have as one input said output of their corresponding first gates and as an other input said delayed initiate signal, wherein during any given priority resolution cycle only one of said second gates is fully enabled and its output indicates that said associated priority level has really won access to said shared resource, said output of each said individual second gates is connected to reset its corresponding ask flip-flops so that once said real winner has been determined, its corresponding ask flip-flop will be reset while those ask flip-flops of all non-winning priority levels remain unchanged, G. a set gate between said ask flip-flop and its corresponding grant flip-flop of all but the lowest priority level, said set gate is partially enabled by said output of its ask flip-flop if its ask flip-flop has been set by said request signal, each said set gate further receives a common request cut-off signal which is initially in a state to partially enable all set gates during said normal priority resolution cycles, said request cut-off signal is derived from delaying said initiate signal sufficient time to allow all said grant flip-flops to set that have their corresponding ask flip-flops set at the beginning of said normal priority resolution cycle, each of said set gates also receives as inputs the inverted outputs of all lower priority level grant flip-flops such that the setting of any lower priority grant flip-flop will disable all said higher priority set gates and thereby prevent any late arriving requests from setting its corresponding grant flip-flop, said output of each ask flip-flop is enabled to set its corresponding grant flip-flop it said set gate is fully enabled, the output of said lowest priority level ask flip-flop is connected directly to set its ask flip-flop thus making the lowest priority logic path the shortest logic path to said cycle initiate means, said common reset signal and said request cut-off signal are derived by delaying said initiate signal so that during said normal priority resolution cycle said reset signal returns to said non-reset state at the beginning of a next priority resolution cycle after said request cut-off signal assumes a request enable state and partially enables all set gates before said next normal priority resolution cycle begins and during an inverse priority resolution cycle said request cut-off signal assumes said request enable state only after said reset signal returns to said non-reset state thereby effectively inverting the priority levels by allowing said lower priority grant flip-flop to set if its corresponding ask flip-flop is set and thereby block a higher priority level by disabling all higher priority set gates.

15. The apparatus as in claim 14 wherein logic is provided to produce an early reset signal for resetting said grant flip-flop.

16. The apparatus of claim 15 wherein the output of said ask flip-flop and said grant flip-flop is ORed together to produce a signal indicating that the associated priority level request has been processed to the point where the associated priority level can make a subsequent request for said shared resource.

17. The apparatus as in claim 14 wherein said second gates are eliminated by providing said delayed initiate signal as an enabling signal to said first gates and wherein the output of said first gates is used as said reset signal to reset said ask flip-flops and to indicate that said associated priority level has really won access to said shared resource.

18. A method for resolving competing requests for a shared resource on a dynamically controllable priority basis comprising:
　A. setting an ask means if the priority level desires use of said shared resource;
　B. setting a grant means if the corresponding ask means of said priority level is set early within a priority resolution cycle;
　C. producing an initiate signal if any grant means has been set;
　D. delaying said initiate signal to produce an inhibit signal used by an inhibit means to inhibit any late arriving requests from setting its corresponding grant means;
　E. delaying said initiate signal to produce an enabling signal into a winner means associated with each priority level which will enable its output if its associated grant flip-flop is set;
　F. resetting said ask means by use of said winning signal so that the ask means of the priority level which has won use of the shared resource is reset and available to receive a subsequent request;
　G. delaying said initiate signal to produce a reset signal which is used to reset all grant flip-flops late within a priority resolution cycle, and wherein said reset signal returns to a non-reset state to begin a next priority resolution cycle after to said inhibit signal returns to a non-inhibit state during a normal priority resolution cycle and wherein said reset signal returns to said non-reset state before said initiate signal returns to said non-inhibit state during a reverse priority resolution cycle and wherein said winning signal is produced by said winning means if its associated grant flip-flop is set and no higher priority grant flip-flops are set and wherein said inhibit means is disabled by the setting of any lower priority grant means and wherein the lowest priority level does not have an inhibit means between its ask flip-flop and its grant flip-flop thereby allowing the lowest priority level to initiate a shared resource cycle in less time than any of the other priority levels.

19. The method in claim 18 wherein said priority levels are broken into a plurality of groups and wherein the normal priority level of said plurality of groups is inverted during said inverse priority resolution cycle by developing a plurality of said inhibit signals and wherein one of said plurality of inhibit signals is associated with one group of said plurality of groups and wherein during said normal priority resolution cycle all said plurality of inhibit signals enable said inhibit means prior to said reset signal returning to said non-reset state and wherein during said inverse priority resolution cycle a first of said plurality of inhibit signals associated with the new highest priority group is enabled after said reset signal returns to said non-reset state followed by the next of said plurality of inhibit signals until each has been enabled and wherein all are enabled before said enabling signal is generated to said winner means.

* * * * *

UNITED STATES PATENT AND TRADEMARK OFFICE
CERTIFICATE OF CORRECTION

PATENT NO. : 4,493,036

DATED : January 8, 1985

INVENTOR(S) : Daniel A. Boudreau and Edward R. Salas

It is certified that error appears in the above-identified patent and that said Letters Patent are hereby corrected as shown below:

On the second page of the issued patent, under the section entitled "BACKGROUND OF THE INVENTION", on the 7th line change the phrase "2. Description of the Prior Art" to --2. Description of a Data Processing System--.

Signed and Sealed this

Sixteenth Day of September 1986

[SEAL]

Attest:

Attesting Officer

DONALD J. QUIGG

Commissioner of Patents and Trademarks